(12) United States Patent
Kelly et al.

(10) Patent No.: US 12,488,270 B2
(45) Date of Patent: Dec. 2, 2025

(54) SINGLE LINE QUBIT CONTROL

(71) Applicant: Google LLC, Mountain View, CA (US)

(72) Inventors: Julian Shaw Kelly, Santa Barbara, CA (US); Anthony Edward Megrant, Goleta, CA (US); Rami Barends, San Diego, CA (US); Charles Neill, Goleta, CA (US); Daniel Thomas Sank, Goleta, CA (US); Evan Jeffrey, Santa Barbara, CA (US); Amit Vainsencher, Goleta, CA (US); Paul Klimov, Santa Barbara, CA (US); Christopher Michael Quintana, Goleta, CA (US)

(73) Assignee: Google LLC, Mountain View, CA (US)

( * ) Notice: Subject to any disclaimer, the term of this patent is extended or adjusted under 35 U.S.C. 154(b) by 1058 days.

(21) Appl. No.: 17/610,241

(22) PCT Filed: May 10, 2019

(86) PCT No.: PCT/US2019/031656
§ 371 (c)(1),
(2) Date: Nov. 10, 2021

(87) PCT Pub. No.: WO2020/231378
PCT Pub. Date: Nov. 19, 2020

(65) Prior Publication Data
US 2022/0246677 A1 Aug. 4, 2022

(51) Int. Cl.
*G06N 10/40* (2022.01)
*G06N 10/20* (2022.01)
(Continued)

(52) U.S. Cl.
CPC .............. *G06N 10/40* (2022.01); *G06N 10/20* (2022.01); *H10N 60/12* (2023.02); *H10N 69/00* (2023.02)

(58) Field of Classification Search
CPC ...... H10N 69/00; H10N 60/805; H10N 60/12; G06N 10/00; G06N 10/40
See application file for complete search history.

(56) References Cited

U.S. PATENT DOCUMENTS

| 2018/0322408 A1* | 11/2018 | Chen | H01P 3/003 |
| 2022/0045416 A1* | 2/2022 | Naaman | G06N 10/00 |

FOREIGN PATENT DOCUMENTS

| CN | 107924490 | 4/2018 |
| CN | 108701261 | 10/2018 |

(Continued)

OTHER PUBLICATIONS

Notice of Allowance in Australian Appln. No. 2019446426, dated Jun. 22, 2023, 3 pages.

(Continued)

*Primary Examiner* — Ryan Johnson
(74) *Attorney, Agent, or Firm* — Fish & Richardson P.C.

(57) ABSTRACT

A quantum computing device includes: a qubit; a single XYZ control line, in which the qubit and the single control line are configured and arranged such that, during operation of the quantum computing device, the single XYZ control line allows coupling of an XY qubit control flux bias, from the single XYZ control line to the qubit, over a first frequency range at a first predetermined effective coupling strength, and coupling of a Z qubit control flux bias, from the single XYZ control line to the qubit, over a second frequency range at a second predetermined effective coupling strength.

21 Claims, 7 Drawing Sheets

(51) Int. Cl.
*H10N 60/12* (2023.01)
*H10N 69/00* (2023.01)

(56) References Cited

FOREIGN PATENT DOCUMENTS

WO  WO-2017058194 A1 * 4/2017 ......... G06F 13/4068
WO  WO2018/106222       6/2018

OTHER PUBLICATIONS

International Preliminary Report on Patentability in International Appln. No. PCT/US2019/031656, dated Aug. 24, 2021, 19 pages.
International Search Report and Written Opinion in International Appln. No. PCT/US2019/031656, dated Feb. 10, 2020, 18 pages.
Kringhoj, "Readout and Control of Semi-Nanowire-Based Superconducting Qubits," Master's Thesis, University of Copenhagen, Faculty of Science, Jul. 2016, 54 pages.
Schmitt, "Operating a transmon based two-quibit processor," Design, fabrication and test of a four superconducting quantum-bit processor, Université Pierre et Marie Curie—Paris VI, Oct. 2015, 30 pages.
Office Action in Chinese Appln. No. 201980097372.1, mailed on Nov. 22, 2024, 13 pages (with English translation).
Office Action in Canadian Appln. No. 3137517, dated Feb. 1, 2023, 5 pages.
AU Office Action in Australian Appln. No. 2019446426, dated Oct. 31, 2022, 3 pages.

* cited by examiner

SINGLE LINE QUBIT CONTROL

CROSS-REFERENCE TO RELATED APPLICATIONS

This application is a National Stage Application, filed under 35 U.S.C. 371 and claims the benefit of International Patent Application No. PCT/US2019/031656 filed on May 10, 2019, the entirety of which is incorporated by reference herein.

TECHNICAL FIELD

The present disclosure relates to qubit control.

BACKGROUND

Large-scale quantum computers have the potential to provide fast solutions to certain classes of difficult problems. Multiple challenges in the design and implementation of quantum architecture to control, program and maintain quantum hardware impede the realization of large-scale quantum computing.

SUMMARY

The present disclosure describes technologies for implementing single line qubit control.

In general, in some aspects, the subject matter of the present disclosure may be embodied in quantum computing devices that include: a qubit; a single XYZ control line, in which the qubit and the single XYZ control line are configured and arranged such that, during operation of the quantum computing device, the single XYZ control line allows coupling of an XY qubit control flux bias, from the single XYZ control line to the qubit, over a first frequency range at a first predetermined effective coupling strength, and coupling of a Z qubit control flux bias, from the single XYZ control line to the qubit, over a second frequency range at a second predetermined effective coupling strength.

The foregoing and other aspects can optionally include one or more of the following features, alone or in combination. For example, in some implementations, the single XYZ control line further includes an inductor arranged to be inductively coupled to the qubit. During operation of the quantum computing device, the single XYZ control line allows coupling of the XY qubit control flux bias, from the single XYZ control line to the qubit, at a first predetermined mutual inductance between the inductor and the qubit, and coupling of the Z qubit control flux bias, from the single XYZ control line to the qubit, at a second predetermined mutual inductance between the inductor and the qubit. The first predetermined mutual inductance may be between the qubit and the inductor of the single XYZ control line, and the second predetermined mutual inductance is between a superconducting quantum interference device (SQUID) of the qubit and the inductor of the single XYZ control line. The superconducting quantum interference device (SQUID) may include a first Josephson junction and a second Josephson junction. The predetermined mutual inductance is determined at least by an asymmetry between the first Josephson junction and the second Josephson junction. The asymmetry between the first Josephson junction and the second Josephson junction may be at least 0.1.

In some implementations, the qubit includes a superconducting qubit. The superconducting qubit may include a transmon qubit.

In some implementations, the single XYZ control line is geometrically designed to achieve the coupling of the XY qubit control flux bias, from the single XYZ control line to the qubit, over the first frequency range at the first predetermined effective coupling strength, and the coupling of the Z qubit control flux bias, from the single XYZ control line to the qubit, over the second frequency range at the second predetermined effective coupling strength.

In some implementations, the single XYZ control line includes a filter, in which the filter includes a first absorptive filter and a second reflective filter directly upstream of the first absorptive filter. The first absorptive filter may include an magnetically loaded epoxide filter. The single XYZ control line further may include: a power combiner arranged to receive as inputs the Z qubit control flux bias and the XY qubit control flux bias at room temperature; and a low pass filter arranged to filter the output of the absorptive filter, in which the qubit. The inductor may be electrically connected to the output of the low pass filter.

In general, in some other aspects, the subject matter of the present disclosure may be embodied in methods for implementing single XYZ control, in which the methods include: coupling an XY qubit control flux bias from a single XYZ control line to a qubit, in which the coupling is performed over a first frequency range at a first predetermined effective coupling strength; and coupling a Z qubit control flux bias from the single XYZ control line to the qubit, in which the coupling is performed over a second frequency range at a second predetermined effective coupling strength.

The foregoing and other aspects can optionally include one or more of the following features, alone or in combination. In some implementations, the methods further include: inductively coupling an inductor to the qubit; coupling the XY qubit control flux bias from the single XYZ control line to the qubit at a first predetermined mutual inductance between the inductor and the qubit; and coupling the Z qubit control flux bias from the single XYZ control line to the qubit at a second predetermined mutual inductance between the inductor and the qubit. The first predetermined mutual inductance may be between the qubit and the inductor of the single XYZ control line, and the second predetermined mutual inductance may be between a superconducting quantum interference device (SQUID) of the qubit and the inductor of the single XYZ control line. The superconducting quantum interference device (SQUID) may include a first Josephson junction and a second Josephson junction. The predetermined mutual inductance may be determined at least by an asymmetry between the first Josephson junction and the second Josephson junction. The asymmetry between the first Josephson junction and the second Josephson junction may be at least 0.1.

The subject matter described in this specification can be implemented in particular ways so as to realize one or more of the following advantages.

As the number of qubits on a quantum chip within a quantum computing device increases, the space available for addressing and reading such qubits may become limited. The present disclosure is directed toward a more efficient qubit addressing scheme in which XY and Z controls of a qubit are combined into a single XYZ control line. By addressing each qubit with a single control line, rather than two or more control lines, the total number of wires required may be reduced, and additional space may be made available to expand the size of the quantum computing chip. Additionally, combining the XY control and the Z control of a qubit into a single control line may have the advantage of reducing a number of points of failure, reducing a number of sources for noise or decoherence, and reducing challenges for the quantum computing chip design.

Multiple other advantages may also be possible, e.g., a reduction of space allocated in a wiring channel connecting the quantum chip with corresponding control devices. The control devices may supply voltage or microwave pulses to one or more qubits on a quantum chip through the wires to, for example, change one or more qubit's frequency or perform quantum gate operations. Further, a reduction of the number of wires may also allow for a reduction of hardware components overall and it may provide more operation stability as it reduces the number of components that may break.

As an example, the number of wires for providing qubit control signals may be reduced to 1 control wire per qubit instead of 2 control line wires per qubit (excluding qubit readout lines). As particular examples, the reduction in the number of control wires may reduce the number of components or attributes such as dilution refrigerator microwave feedthroughs, wiring in different temperature regimes, the number of thermal clamps for each of a number of dilution refrigerator stages, the number of various filters, the number of passive thermal loads, the number of connectors (e.g., SMA connectors). The reduction of a number of control wires may also reduce wire bonding, wire routing on the quantum chip, or a qubit control footprint. Further, by providing a single XYZ control line, a coupling between a bias line and a qubit can be measured experimentally.

The details of one or more implementations are set forth in the accompanying drawings and the description below. Other features and advantages will be apparent from the description, the drawings, and the claims.

DETAILED DESCRIPTION

This specification relates to an improved quantum computing device. In particular, this specification describes an apparatus for controlling qubits involved in a quantum computation using a single control line.

Controlling qubits includes the realization of two operations: a microwave or XY control, and a frequency or Z control, where X, Y, and Z refer to the coordinates of a qubit state's representation as a Bloch sphere. These operations can be implemented independently using two separate control lines. For example, the XY control line may be capacitively coupled to a circuit that realizes the qubit and the Z control line may be inductively coupled to a SQUID of the same circuit. Realization of the XY control is subject to different requirements than the realization of the Z control. For example, the XY control is realized using different frequency ranges than those used to realize the Z control. With separate control lines these different requirements can be addressed independently for each qubit. Combining the XY and Z control line into a single XYZ control line may lead to different technical problems such as, for example, problems arising from the aforementioned different requirements for XY and Z control.

Single line qubit control may be accomplished using a single XYZ control line that is electromagnetically (e.g., inductively or inductively and capacitively) coupled to a qubit circuit realizing the qubit. With a single XYZ control line, the Z control may be realized, e.g., via inductive coupling through a mutual inductance with the qubit. The XY control with a single XYZ control line may be realized, for example, through an additional capacitive coupling of the single XYZ control line to the qubit circuit. Alternatively, the XY control with a single XYZ control line can be realized through an additional mutual inductance between the qubit circuit. The inductive coupling through the additional mutual inductance may be designed such that some predetermined value of a particular parameter associated with the qubit is achieved. For example, the mutual inductance may be designed based on a predetermined effective coupling strength between the single XYZ control line and the qubit or based on a predetermined relaxation time or rate of the qubit. The predetermined effective coupling strength between the single XYZ control line and the qubit may have a predetermined relaxation time or rate of the qubit associated with it. The inductive coupling through the additional mutual inductance can be designed using different design parameters. For example, the additional mutual inductance can be designed by creating a particular asymmetry between Josephson junctions that may be part of the qubit circuit or by creating an asymmetry in the geometry of the single XYZ control line.

Figure 1:
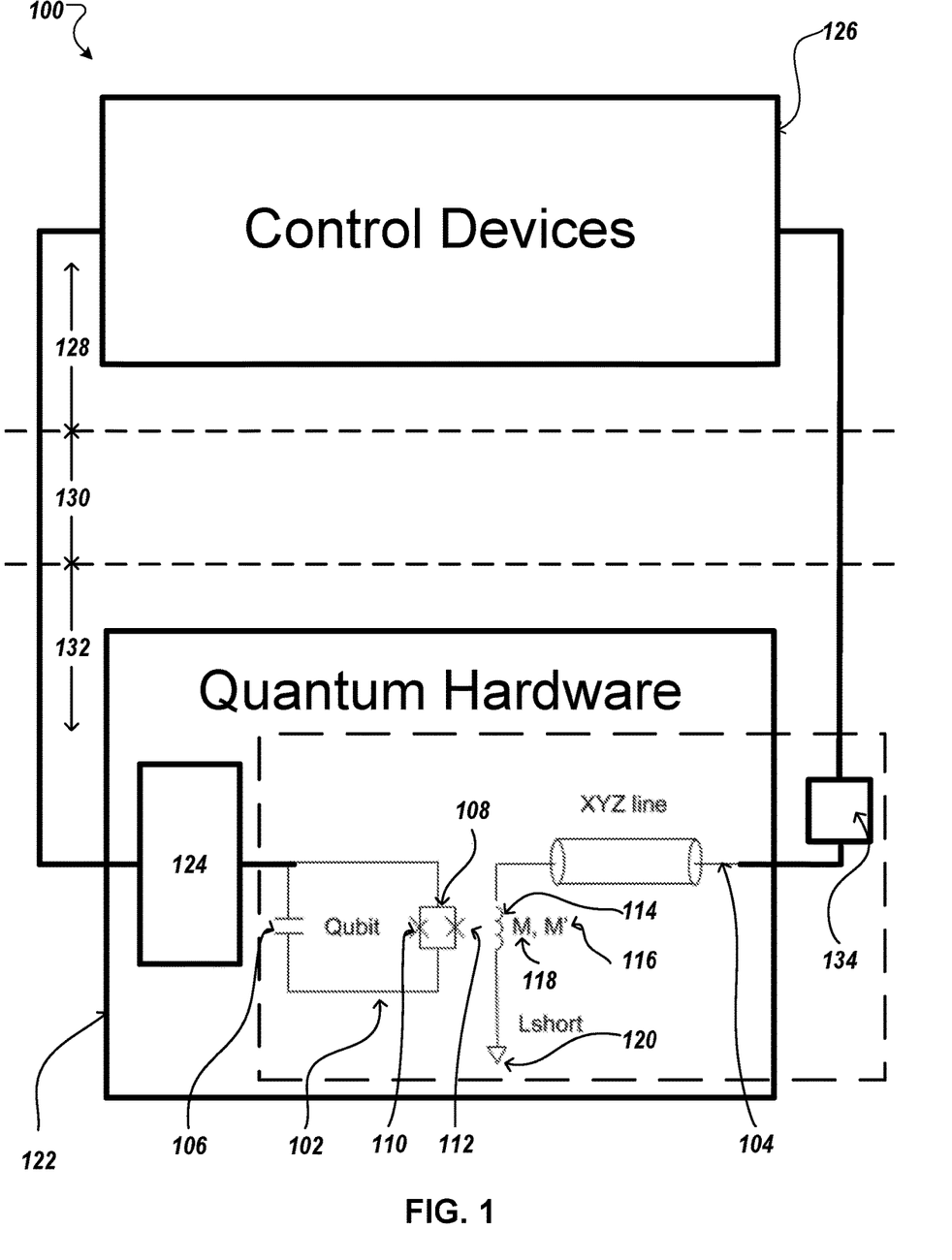
FIG. 1 is a schematic that illustrates an example of a quantum computing device including a qubit with a single XYZ control line.

FIG. 1 is a schematic that illustrates a quantum computing device 100 that includes a qubit 102 with a single XYZ control line 104. Though a single qubit 102 is shown, device 100 may include multiple qubits, each with a corresponding single XYZ control line as described herein. Qubit 102 may be a superconducting qubit. For example, qubit 102 may be a transmon qubit. Other qubit architectures may be used instead. Single XYZ control line 104 may be, e.g., a wire.

Qubit 102 and single XYZ control line 104 may be subcomponents of quantum hardware 122. For example, quantum hardware 122 may include additional qubits and additional single XYZ control lines. Quantum hardware 122 may include one or more measurement subcomponents 124 to measure the state of a qubit, e.g., to measure the state of qubit 102. For example, measurement subcomponent 124 may be a readout resonator.

Quantum computing device 100 includes control devices 126. Control devices 126 may include one or more arbitrary waveform generators or other types of electrical signal generating devices. For example, different waveform generators may be used to produce the same or different waveforms at the same time or at different times, e.g., to produce waveforms as simultaneous XY and Z control signals through single XYZ control line 104.

Qubit 102 may include a capacitor 106 and a superconducting quantum interference device (SQUID) loop 108 including a first Josephson junction 110 and a second Josephson junction 112. Single XYZ control line 104 may be inductively coupled to qubit 102 through inductor 114. Single XYZ control line 104 may be inductively coupled to the SQUID loop 108 through a first mutual inductance M' 116 and to the qubit circuit through a second mutual inductance M 118. The first mutual inductance M' 116 determines a level of coupling between a qubit mode and a qubit drive line. The second mutual inductance M 118 determines the amount of flux through a SQUID loop of the qubit. Single XYZ control line 104 ends in a short 120 to ground.

Single XYZ control line 104 may be connected to control devices 126. Control devices 126 and a first part of single XYZ control line 104 may be located in a first temperature regime 128. The first temperature regime may have a temperature of about 300K but may also have a higher or lower temperature. The first temperature regime 128 may correspond to the temperature of a lab or any room or place the quantum computing device may be located in. A second part of XYZ control line 104 may be in a second temperature regime 130. The second temperature regime 130 may have a temperature of about 3K but may also have a higher or lower temperature. The second temperature regime 130 may correspond to a first refrigerator stage (e.g., a first dilution refrigerator stage) that includes a second refrigerator stage (e.g., a second dilution refrigerator stage) and quantum hardware 122. Quantum hardware 122 and a third part of single XYZ control line 104 may be in a third temperature regime 132. The third temperature regime 132 may have a temperature of about 0.01K but may also have a higher or lower temperature. The third temperature regime 132 may correspond to a second refrigerator stage. The third part of single XYZ control line 104 may include inductor 114 and short 120.

Qubit 102 and single XYZ control line 104 are configured and arranged such that, during operation of the quantum computing device 100, single XYZ control line 104 allows coupling of an XY qubit control flux bias, from single XYZ control line 104 to qubit 102, over a first frequency range at a first predetermined effective coupling strength, and coupling of a Z qubit control flux bias, from single XYZ control line 104 to qubit 104, over a second frequency range at a second predetermined effective coupling strength.

The first frequency range may be about 4 GHz to about 10 GHz. The second frequency range may be about 0 MHz to about 4 GHz. The first predetermined effective coupling strength may be about 0.5 to about 20 pH. The second predetermined effective coupling strength may be about 0.1 to about 5 pH.

In a circuit design such as the example shown in FIG. 1, Z control of the qubit 102 may be achieved through single XYZ control line 104 by coupling of the Z qubit control flux bias, from single XYZ control line 104 to the qubit 102, via the second mutual inductance M 118. The second mutual inductance M 118 may be predetermined by the second predetermined effective coupling strength. For example, the second mutual inductance M 118 may have a value of approximately 2 to 3 pH. Further, the second mutual inductance M 118 may be between qubit 102 and single XYZ control line 104.

In an alternative circuit design, single XYZ control line 104 may instead be used exclusively as a Z control line and XY control may be achieved with a separate control line, for example an XY control line that is capacitively coupled to qubit 102. In such an alternative circuit design the first mutual inductance M' 116 is a stray coupling to the qubit mode. Thus, in such an alternative circuit design the first mutual inductance M' 116 is a quantity to be reduced to prevent unwanted coupling and leakage errors as a consequence thereof.

In a circuit design such as the example shown in FIG. 1, XY control may instead be achieved through single XYZ control line 104 by coupling of the XY qubit control flux bias, from single XYZ control line 104 to the qubit 102, via the first mutual inductance M' 116. Thus, as opposed to the alternative circuit design, the first mutual inductance M' 116 may be utilized to provide the XY control. The first mutual inductance M' 116 may be predetermined by the first predetermined effective coupling strength. Further, the second mutual inductance M 118 may be between SQUID loop 108 and single XYZ control line 104.

The first mutual inductance M' 116 may provide the XY control via XYZ control line 104 through an asymmetry between the first Josephson junction 110 and the second Josephson junction 112. That is, the first Josephson junction 110 and the second Josephson junction 112 may be asymmetric with respect to one another. For example, the asymmetry between the first Josephson junction 110 and the second Josephson junction 112 that provides the XY control via XYZ control line 104 may be at least a factor of 0.1 or 10% (e.g., at least 0.2 or 20%). Different values for the asymmetry between the first Josephson junction 110 and the second Josephson junction 112 may be chosen based on the value of the first mutual inductance M' 116 that is to be achieved. The asymmetry may be achieved by changing the area of the first Josephson junction 110 and/or the second Josephson junction 112 so that the area of the first Josephson junction 110 is different from the area of the second Josephson junction 112. Alternatively, or in addition, the asymmetry may be achieved by changing the thickness of the first Josephson junction 110 and/or the second Josephson junction 112.

A design principle for single XYZ control line 104 may be that a predetermined effective coupling strength to qubit 102 is to be achieved or that a predetermined relaxation rate or time (or coherence time) for qubit 102 is to be achieved. This predetermined relaxation rate or time may be a relaxation rate or time that is approximately the same as a relaxation rate or time that has been achieved for a qubit that does not have a single XYZ control line. For example, the predetermined relaxation rate or time may be the relaxation rate or time of a qubit that has a Z control line and a separate XY control line. The predetermined relaxation rate or time may be approximately 100 µs, 1 ms, or 1.5 ms, but may also be shorter or longer.

The relaxation rates of a qubit 102 due to the coupling between qubit 102 and the XY qubit control flux bias and due to the coupling between the SQUID loop 108 of qubit 102 and the Z qubit control flux bias are related to or functionally dependent on the first mutual inductance M' 116 and the second mutual inductance M 118, respectively.

The Josephson Hamiltonian that describes a system such as the qubit circuit shown in FIG. 1 can be expressed as $$\hat{H}_J = -E_{J\Sigma}\cos\left(\frac{\pi\Phi}{\Phi_0}\right)\sqrt{1+d^2\tan^2\left(\frac{\pi\Phi}{\Phi_0}\right)}\cos(\phi-\phi_0) \quad (1)$$

with superconducting flux quantum $$\Phi_0 = \frac{h}{2e},$$

magnetic flux through the SQUID loop 108 $\Phi$, the effective phase difference $\phi=(\phi_1+\phi_2)/2$, the individual superconducting phase differences $\phi_1$, $\phi_2$ across junctions 1 and 2, the phase $\phi_0$ determined by $\tan \phi_0 = d \tan(\pi\Phi/\Phi_0)$, Josephson junction asymmetry $d=(E_{J2}-E_{J1})/(E_{J1}+E_{J2})$, $E_{J\Sigma}=E_{J1}+E_{J2}$, and Josephson (coupling) energies $E_{J1}$, $E_{J2}$. An estimate for the relaxation rate due to the coupling between the SQUID loop 108 and the Z qubit control flux bias through the second mutual inductance M 118 can be expressed as $$\Gamma_1 = \frac{1}{T_1} = \frac{1}{\hbar^2}|\langle 1|\hat{A}|0\rangle|^2 M^2 S_{I_n}(\omega_{01}) \quad (2)$$

with current noise $S_{I_n}(\omega_{01})$ and $$\hat{A} = E_{J\Sigma}\frac{\pi}{\Phi_0}\left[\sin\left(\frac{\pi\Phi_e}{\Phi_0}\right)\cos\phi - d\cos\left(\frac{\pi\Phi_e}{\Phi_0}\right)\sin\phi\right] \quad (3)$$

with external flux $\Phi_e=\Phi-\Phi_n$ and flux noise $\Phi_n$. An estimate for the relaxation rate due to the coupling between qubit 102 and the XY qubit control flux bias through the first mutual inductance M' 116 can be expressed as $$\Gamma_1 \approx \frac{M'^2 \omega^4 C}{R} \quad (4)$$

with $$\omega = 1/\sqrt{LC}, \ C \approx \frac{e^2}{2}E_C, \ L \approx \hbar^2/(4e^2 E_{J\Sigma}),$$

and charging energy $E_C$. The value R is the impedance of the control transmission line, typically 50 ohms. The predetermined fixed value of the relaxation rate can be achieved by appropriately designing the first mutual inductance M' 116. The first mutual inductance M' 116 can be appropriately designed by an asymmetric design of the single XYZ control line geometry or by an asymmetry between the first Josephson junctions 110 and the second Josephson junction 112 that determines the first mutual inductance M' 116 when the remaining parameters are fixed as can be seen from eqn. (4). Appropriately designing the first mutual inductance M' 116 may involve using the predetermined value of the relaxation rate as an upper bound and then determining values of the first mutual inductance M' 116 according to that upper bound. In addition, determining values of the first mutual inductance M' 116 may also involve determining an amount of qubit noise associated with the determined values and choosing values that do not produce qubit noise above a predetermined threshold.

Alternatively or in addition, the first mutual inductance M' 116 may be designed by geometrically designing the single XYZ control line 104 to achieve the first predetermined effective coupling strength. An example of an asymmetric design of the single XYZ control line 104 geometry that allows to design the first mutual inductance M' 116 by adjusting corresponding asymmetry parameters will be explained in more detail with reference to FIG. 2 below.

Further, single XYZ control line 104 may include or be coupled to a filter 134 designed to attenuate in the 0 to 0.5 GHz frequency band and the 4 to 8 GHz band. With separate XY and Z control lines as in the alternative circuit design, the XY line may include an attenuator to reduce noise on the line. With the XY control signals operating in the microwave frequency band, the attenuator may not adversely affect operation of a qubit realized using the alternative circuit design. The Z control line, however, operates in the 0-0.5 GHz band. Accordingly, if an attenuator were coupled to single XYZ control line 104, the Z qubit control signal may lead to substantial joule heating within the attenuator. The heating, in turn, may increase noise and render it difficult to maintain the low temperature that may be necessary to provide superconducting operation of circuit elements of qubit 102, e.g., the temperature in the third temperature regime 132. For instance, the joule heating may exceed the cooling power of the third temperature regime. Accordingly, in place of an attenuator, a filter designed to attenuate in the 0 to 0.5 GHz frequency band and the 5 to 8 GHz band such as filter 134 may be coupled to the single XYZ control line 104 instead. In particular, filter 134 may provide 20 db attenuation in the microwave frequency band. For example, filter 134 may be composed of a first absorptive bandpass filter and a second reflective filter. The absorptive bandpass filter may include rigid, magnetically loaded epoxide, rubber, or urethane foam materials such as, e.g., an Eccosorb® filter. The absorptive filter 134 may be arranged downstream of the reflective filter relative to single XYZ control line 104. The filter 134 may be electrically connected to an inductor of the single XYZ control line 104. For instance, the filter 134 may be ohmically connected to the inductor of the single XYZ control line 104.

Figure 2:
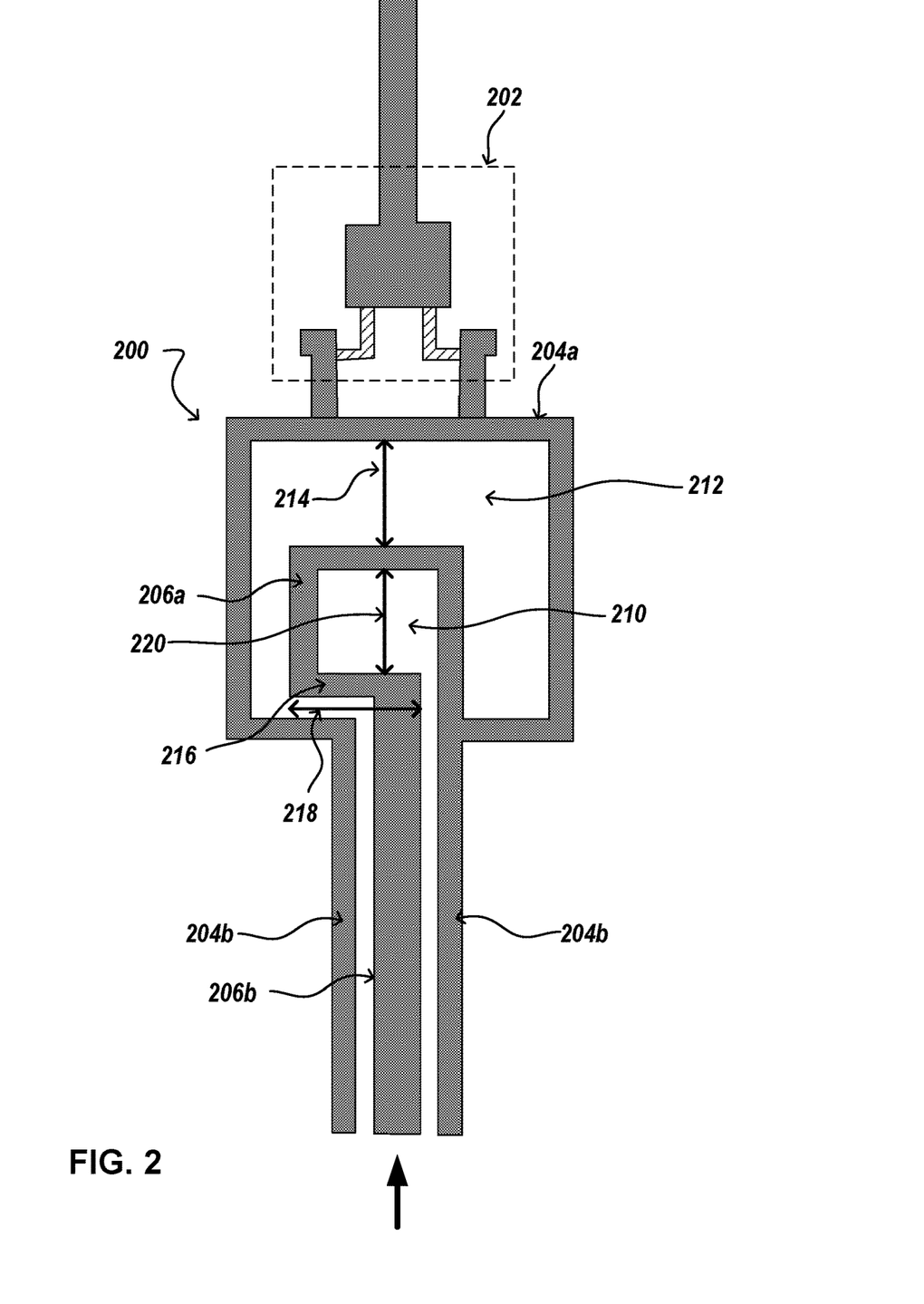
FIG. 2 is a schematic that illustrates an example of a single XYZ control line geometrically designed to achieve a particular mutual inductance.

FIG. 2 is a schematic that illustrates a top view of a single XYZ control line 200 geometrically designed to achieve a particular mutual inductance. Single XYZ control line 200 is adjacent to a qubit 202. Single XYZ control line 200 and qubit 202 may correspond to single XYZ control line 104 and qubit 102 described with reference to FIG. 1, respectively. Single XYZ control line 200 and qubit 202 may be formed by thin film deposition and patterning of electrical conductors and insulators on a dielectric substrate, such as silicon or sapphire. In the present example, the control line 200 includes a superconductor trace patterned to form a shape having an inner trace (206a, 206b) and an outer trace (204a, 204b), in which the outer trace extends around and is connected with the inner trace. At an end of an elongated portion 206b of the inner trace, the inner trace forms an inner ring 206a. Similarly, the outer trace may include an outer ring 204a formed at the ends of elongated portions 204b of the outer trace. The inner ring 206a is located within and substantially surrounded by the outer ring 204a. The elongated portion 206b of the inner trace extends substantially parallel with the elongated portions 204b of the outer trace, in which each elongated portion 206b is separated from the elongated portion 204b by a corresponding gap. The inner ring 206a encircles an inner region 210, in which no superconductor material is formed (e.g., the dielectric substrate is exposed). The inner region 210 extends into one of the gaps located between the elongated portion 206b of the inner trace and an elongated portion 204b of the outer trace. Similarly, the outer ring 204a is separated from the inner ring 206a by an intermediate region 212 in which no superconductor material is formed (e.g., the dielectric substrate is exposed). For ease of viewing, the ground plane is omitted from the schematic of FIG. 2. In some implementations, the outer trace may be directly physically in contact with the ground plane, in which the ground plane is formed on a surface of the dielectric substrate. For instance, the ground plane may extend along the outer sides of the outer traces up to and including the outer ring 204a. During operation, current I may be provided to elongated portion 206b.

Several geometrical features of the single control line 200 may be modified to adjust the mutual inductance between the control line 200 and the qubit 202. For instance, the control line 200 includes a first distance 214 that corresponds to a length of the intermediate gap region 212 between the outer ring 204a and the inner ring 206a along a direction towards the qubit 202. Adjusting the first distance 214 controls the primary coupling M' to a SQUID of the qubit. The primary coupling M' may correspond to the first mutual inductance M' 116 described with reference to FIG. 1. The inner ring 206a of the control line 200 also includes a horizontal portion 216 coupled to the end of the elongated portion 206b, in which the horizontal portion 216 extends substantially perpendicular to the elongated direction of portion 206b and to the direction of the gap length 214. The size of the horizontal portion 216 is given as a second distance 218. This second distance 218 may be adjusted to null a net coupling (altering M') to a co-planar waveguide mode of the control line 200. Thirdly, the inner region 210 of the inner ring 206a has a third distance 220 that extends in generally the same direction as the elongated portion 206b and the gap length 214. The third distance 220, which determines the size of the inner region 210, may be adjusted to allow for tolerance in the dimensions of the first distance 214 and the second distance 218. In each case, these distances may be adjusted by, e.g., modifying the width of the superconducting traces used to form the inner trace and the outer trace and/or by modifying a location of the inner trace and/or the outer trace.

Varying the first distance 214 and the third distance 220 will primarily modify the mutual inductance M, whereas modifying the second distance 218 will primarily modify mutual inductance M'. Decreasing the first distance 214 increases the mutual inductance M since the inner trace of the control line through which current flows is positioned closer to the qubit 202. In contrast, increasing the first distance 214 will decrease the mutual inductance M as the inner trace is moved away from the qubit 202. Increasing distance 218 increases M' including, in some implementations, through a zero-crossing value. Modifying the first distance 214 may not, or at least not substantially, affect a mutual inductance M'. The mutual inductance M may correspond to the second mutual inductance M 118 described with reference to FIG. 1. The difference between the first distance 214 and the third distance 220 can be determined such that a predetermined relaxation rate for qubit 202 is achieved as is explained in more detail with reference to FIG. 1.

The value of second distance 218 describes a particular asymmetry parameter of this example design. Other designs with different asymmetry parameters are possible. For example, single XYZ control line 200 and qubit 202 may be arranged differently with respect to each other. For instance, in some cases, the single XYZ control line 200 and qubit 204 may be incorporated into a stacked geometry rather than a planar geometry as shown in FIG. 2. A stacked geometry may include, e.g., a flip-chip structure, in which the control line 200 is arranged on a first chip and the qubit 204 is arranged on a second chip bonded (e.g., bump bonded) to the first chip. As another example, a different geometric form may be chosen for single XYZ control line 200. Further, different types of single XYZ control lines and qubits may provide different geometric design options including different asymmetry parameters.

Figure 3A:
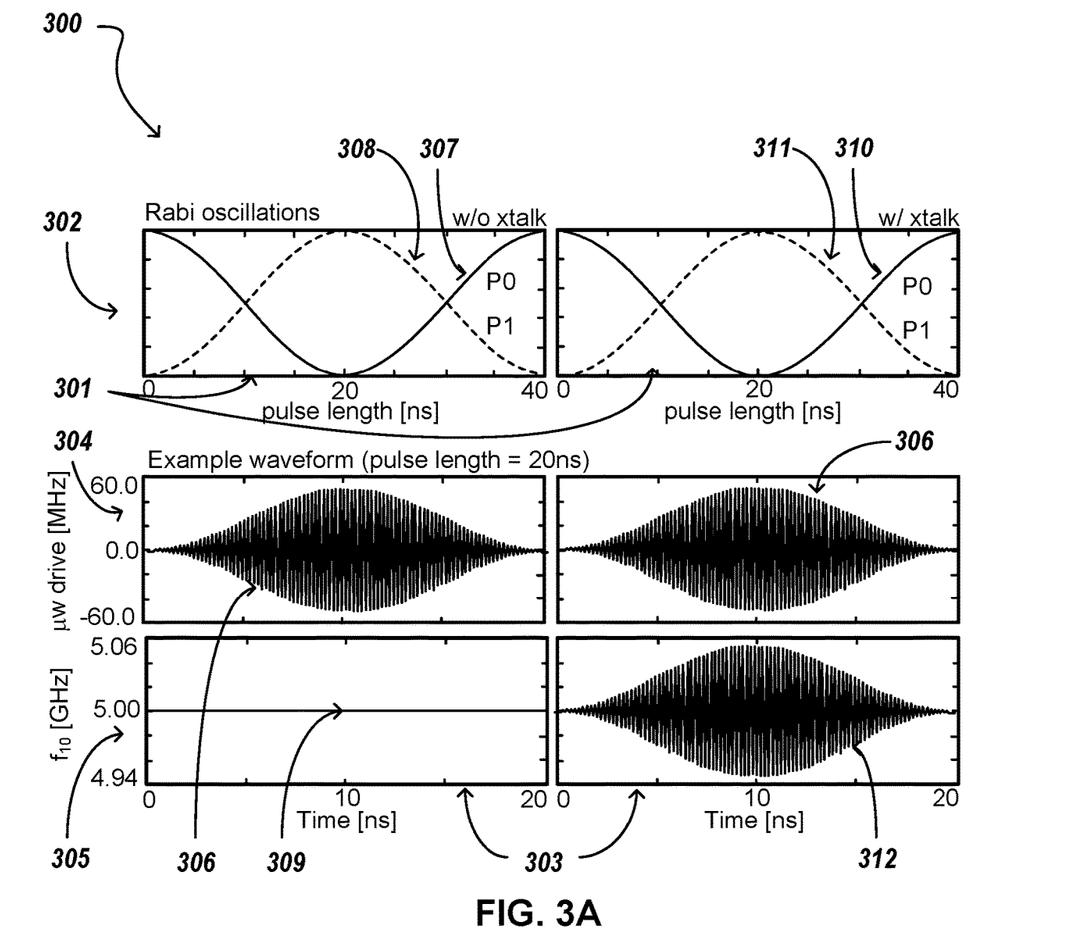
FIG. 3A shows simulation results for comparing Rabi oscillations between two qubit levels using a single XYZ control line.

FIG. 3A shows simulation results 300 for comparing Rabi oscillations between two states of a qubit resulting from a microwave Pi pulse for XY control without and with simultaneous Z (frequency) control using a single XYZ control line, for example single XYZ control line 104 as described with reference to FIG. 1.

The left side of FIG. 3A shows simulation results for XY control without simultaneous Z control. The two plots at the top include a vertical axis 302 representing a probability taking values between 0 and 1 as a function of duration of a complete gate (horizontal axis 301 in nanoseconds). The two plots at the bottom include a horizontal axis 303 representing time in nano seconds and a vertical axis 304 representing a qubit frequency $f_{10}$ in GHz. The two plots in the middle include the same horizontal axis 303 as the two plots at the bottom and a vertical axis 305 representing a microwave (μw) drive frequency in MHz.

A microwave pi pulse with a pulse length of ns and an example waveform 306 shown in the middle plot on the left side was applied to the qubit, for example qubit 102 of FIG. 1. This induced Rabi oscillations shown in the plot at the top on the left side. The probability of the qubit to be in the state |0>, $P_0$, is given by line 307 and follows a cosine starting with probability 1 in the state |0>.

The probability of the qubit to be in the state |1>, $P_1$, is given by line 308 and follows a complementary sine starting with probability 0 in the state |0> and increasing to probability 1. During the application of the microwave pi pulse, the qubit frequency was kept at a constant value of approximately 5 GHz as shown by line 309 in the plot at the bottom of the left side. Thus, as can be seen in the top left plot, the probability 307 of the qubit to be in the state |0> decreases to 0 at the end of the microwave drive pulse (i.e., at pulse length=20 ns). Similarly, the probability 308 of the qubit to be in the state |1> increases to 1 at the end of the microwave drive pulse (i.e., at pulse length=20 ns).

The right side of FIG. 3A shows simulation results for XY control with simultaneous Z control. A microwave pi pulse with an example pulse length of 20 ns and the same example waveform 306 shown in the middle plot on the right side was applied to the qubit, for example qubit 102 of FIG. 1. This induces Rabi oscillations shown in the plot at the top on the right side. Again, the probability of the qubit to be in the state |0>, $P_0$, is given by line 310 and follows a cosine starting with probability 1 in the state |0>, decreasing to probability 0 at the end of the pulse (at pulse length=20 ns) and increasing to 1 following the pulse application. The probability of the qubit to be in the state |1>, $P_1$, is given by line 311 and follows a complementary sine starting with probability 0 in the state |0>, increasing to probability 1 at the end of the pulse (at pulse length=20 ns) and decreasing to 0 following the pulse application. Simultaneous to the application of the microwave pi pulse with the same example waveform 306, a frequency pulse ($f_{10}$) with a pulse length of 20 ns and an example waveform 312 shown in the bottom plot on the right side is applied to the qubit, for example qubit 102 of FIG. 1.

The Rabi oscillations shown in the plots at the top on the left side and at the top on the right side are substantially the same. Thus, the simulation results 300 show that the simultaneous application of a microwave pulse and a frequency pulse to a qubit using a single XYZ control line does not introduce additional error or leakage compared to the application of a microwave pulse using an XY control line without simultaneous application of a frequency pulse. Such results run counter to an expectation that driving a pulse that can excite coupling through both M and M' at the same time would lead to adverse effects.

Figure 3B:
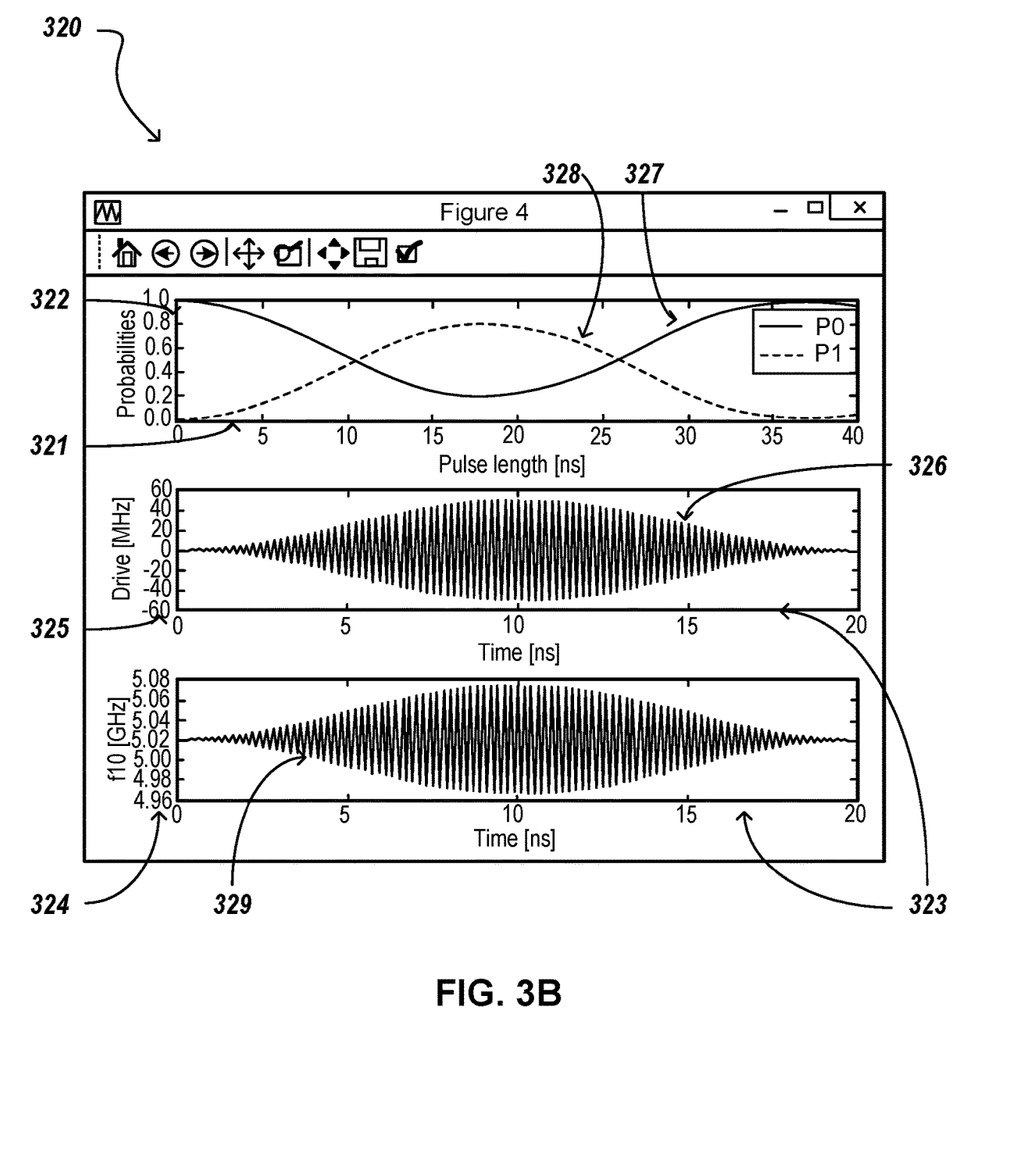
FIG. 3B shows simulation results for respective probabilities to occupy one of two qubit states using a single XYZ control line.

FIG. 3B shows simulation results 320 for respective probabilities to occupy one of two states of a qubit under simultaneous microwave or XY control and frequency or Z control on a linear scale using a single XYZ control line and with the qubit 20 MHz detuned from the microwave drive. The plot at the top shows the probability of qubit population (vertical axis 322) as a function of duration of a complete gate (horizontal axis 321). The plot at the bottom includes a horizontal axis 323 representing time in nanoseconds and a vertical axis 324 representing a qubit frequency $f_{10}$ in GHz. The plot in the middle includes the same horizontal axis 323 as the plot at the bottom and a vertical axis 325 representing a microwave drive frequency in MHz.

A microwave pi pulse with an example pulse length of 20 ns and an example waveform 326 shown in the middle plot is applied to the qubit through a single XYZ control line, for example qubit 102 and single XYZ control line 104 of FIG. 1. The qubit is detuned from the microwave drive by an amount of 20 MHz. The probability of the qubit to be in the state $|0\rangle$, $P_0$, is given by line 327 and follows a damped cosine starting with probability 1 in the state $|0\rangle$, decreasing to probability 0 at the end of the pulse and increasing to 1 following the pulse application. The probability of the qubit to be in the state $|1\rangle$, $P_1$, is given by line 328 and follows a complementary damped sine starting with probability 0 in the state $|0\rangle$, increasing to probability 1 at the end of the pulse and decreasing to 0 following the pulse application. Simultaneous to the application of the microwave pi pulse with example waveform 326, a frequency pulse with a pulse length of 20 ns and an example waveform 329 shown in the bottom plot is applied to the qubit through a single XYZ control line, for example qubit 102 and single XYZ control line 104 of FIG. 1.

The simulation results 320 show that the simultaneous application of a microwave pulse and a frequency pulse to a qubit that is detuned from the microwave drive by 20 MHz using a single XYZ control line does not introduce additional error or leakage compared to the application of a microwave pulse using an XY control line without simultaneous application of a frequency pulse.

Figure 3C:
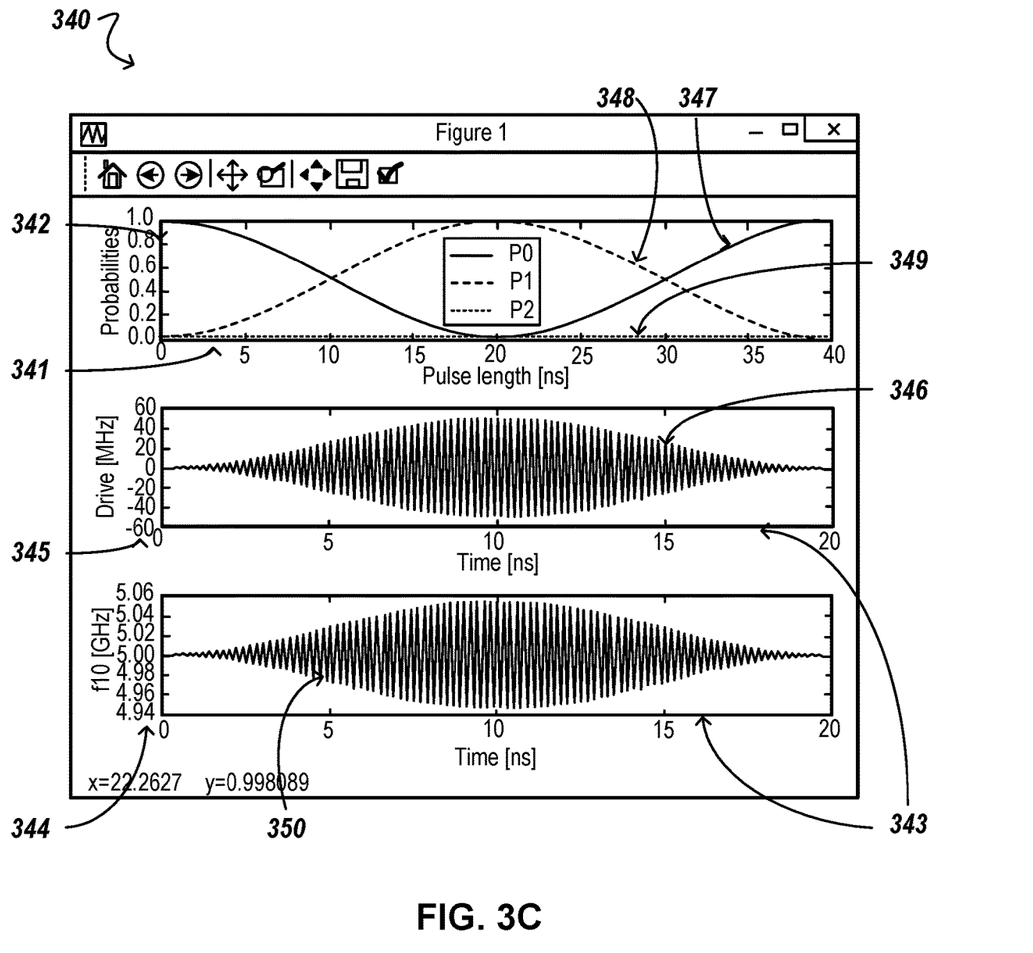
FIG. 3C shows simulation results for respective probabilities to occupy one of two qubit states or the first excited state that is outside the computational qubit subspace using a single XYZ control line.

FIG. 3C shows simulation results 340 for respective probabilities to occupy one of three states (P0 or P1) of a qubit or the first excited state (P2) that is outside the computational qubit subspace under simultaneous microwave or XY control and frequency or Z control on a linear scale using a single XYZ control line. The plot at the top shows the probability of qubit population (vertical axis 342) as a function of duration of a complete gate (horizontal axis 341). The plot at the bottom includes a horizontal axis 343 representing time in nano seconds and a vertical axis 344 representing a qubit frequency $f_{10}$ in GHz. The plot in the middle includes the same horizontal axis 343 as the plot at the bottom and a vertical axis 345 representing a microwave drive frequency in MHz.

A microwave pi pulse with an example pulse length of 20 ns and an example waveform 346 shown in the middle plot is applied to the qubit through a single XYZ control line, for example qubit 102 and single XYZ control line 104 of FIG. 1. The probability of the qubit to be in the state $|0\rangle$, $P_0$, is given by line 347 and follows a cosine starting with probability 1 in the state $|0\rangle$, decreasing to probability 0 at the end of the pulse (at 20 ns) and increasing to 1 following the pulse application. The probability of the qubit to be in the state $|1\rangle$, $P_1$, is given by line 348 and follows a complementary sine starting with probability 0 in the state $|0\rangle$, increasing to probability 1 at the end of the pulse (at 20 ns) and decreasing to 0 following the pulse application. The probability of the qubit to be in the first excited state outside the computational subspace $|2\rangle$, $P_2$, is given by line 349 which is approximately constant zero during the whole pulse duration. Simultaneous to the application of the microwave pi pulse, a frequency pulse with a pulse length of 20 ns and an example waveform 350 shown in the bottom plot is applied to the qubit through a single XYZ control line, for example qubit 102 and single XYZ control line 104 of FIG. 1.

The simulation results 340 show that the simultaneous application of a microwave pulse and a frequency pulse to a qubit using a single XYZ control line does not introduce additional error or leakage compared to the application of a microwave pulse using an XY control line without simultaneous application of a frequency pulse.

Figure 3D:
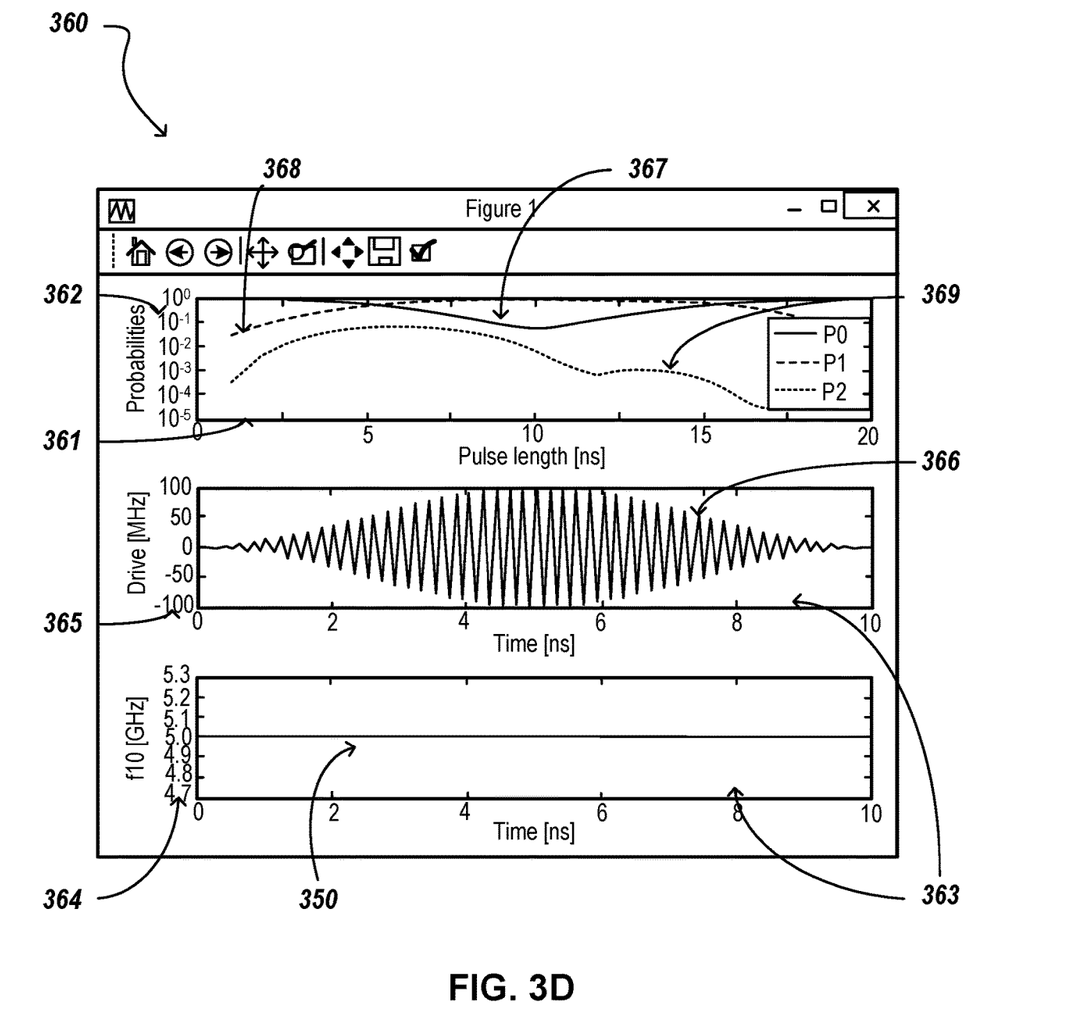
FIG. 3D shows simulation results for respective probabilities to occupy one of two qubit states or the first excited state that is outside the computational qubit subspace using a single XYZ control line.

FIG. 3D shows simulation results 360 for respective probabilities to occupy one of two states (P0 or P1) of a qubit or the first excited state (P2) that is outside the computational qubit subspace under microwave or XY control and without frequency or Z control on a semi-logarithmic scale using a single XYZ control line. The plot at the top shows the probability of qubit population (vertical axis 362) as a function of duration of a complete gate (horizontal axis 361). A logarithmic scale is used for vertical axis 362. The plot at the bottom includes a horizontal axis 363 representing time in nano seconds and a vertical axis 364 representing a qubit frequency $f_{10}$ in GHz. The plot in the middle includes the same horizontal axis 363 as the plot at the bottom and a vertical axis 365 representing a microwave drive frequency in MHz.

A microwave pulse with an example pulse length of 10 and an example waveform 366 shown in the middle plot is applied to the qubit through a single XYZ control line, for example qubit 102 and single XYZ control line 104 of FIG. 1. The probability of the qubit to be in the state $|0\rangle$, $P_0$, is given by line 367 with an initial probability of 1 that decreases to a minimal probability of approximately $10^{-2}$ at the end of the pulse and increases to following the pulse application. The probability of the qubit to be in the state $|1\rangle$, $P_1$, is given by line 368 with an initial probability of approximately $10^{-2}$ that increases to probability 1 at the pulse length and decreases to 0 following the pulse application. The probability of the qubit to be in the first excited state outside the computational subspace $|2\rangle$, $P_2$, is given by line 369 which is about at least an order of magnitude smaller than the probabilities $P_0$ and $P_1$. During the application of the microwave pi pulse the qubit frequency is set to approximately 5 GHz as is shown by line 370 in the plot at the bottom.

The simulation results 360 show that the application of a microwave pulse to a qubit using a single XYZ control line does not introduce additional error or leakage compared to the application of a microwave pulse using a separate XY control line.

Figure 4:
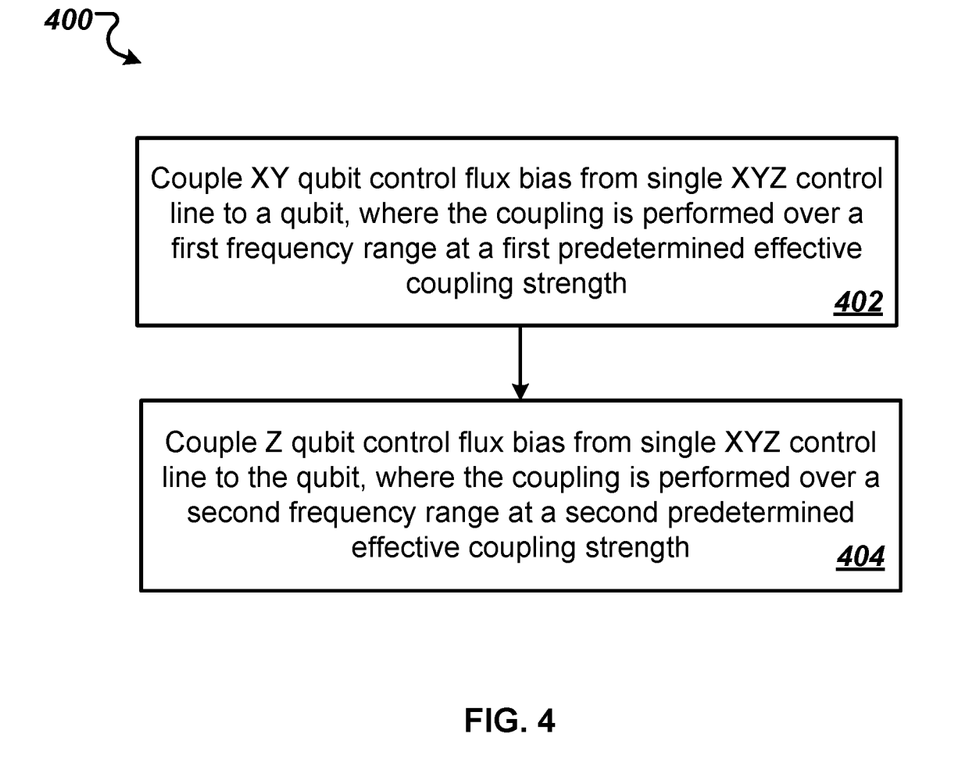
FIG. 4 is a flowchart of an example process for implementing single XYZ control.

FIG. 4 is a flowchart of an example process 400 for implementing single XYZ control. For example, the process 400 may be used to implement single XYZ control using the quantum computing device of FIGS. 1-3. For convenience, the process 400 will be described as being performed by quantum hardware in communication with control electronics located in one or more locations. For example, the device 100 of FIG. 1, appropriately programmed in accordance with this specification, can perform the process 400.

An XY qubit control flux bias is coupled from a single XYZ control line to a qubit (step 402). The coupling is performed over a first frequency range at a first predetermined effective coupling strength.

In some implementations an inductor is further inductively coupled to the qubit. In these implementations the XY qubit control flux bias is coupled from the single XYZ control line to the qubit at a first predetermined mutual inductance between the inductor and the qubit, where the first predetermined mutual inductance is between the qubit and the inductor of the single XYZ control line.

A Z qubit control flux bias is coupled from the single XYZ control line to the qubit (step 404). The coupling is performed over a second frequency range at a second predetermined effective coupling strength.

In implementations where an inductor is further inductively coupled to the qubit, the Z qubit control flux bias is coupled from the single XYZ control line to the qubit at a second predetermined mutual inductance between the inductor and the qubit, where the second predetermined mutual inductance is between a superconducting quantum interference device (SQUID) of the qubit and the inductor of the single XYZ control line. In some implementations the superconducting quantum interference device (SQUID) includes a first Josephson junction and a second Josephson junction. In these implementations the predetermined mutual inductance is determined at least by an asymmetry between the first Josephson junction and the second Josephson junction, e.g., an asymmetry of 0.2.

Implementations of the subject matter and operations described in this specification can be implemented in digital electronic circuitry, analog electronic circuitry, suitable quantum circuitry or, more generally, quantum computational systems, in tangibly-embodied software or firmware, in computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital, analog and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable computers, operating with one or more processors, as appropriate, executing one or more computer programs to perform functions by operating on input data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more computers to be "configured to" perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For example, a quantum computer may receive instructions from a digital computer that, when executed by the quantum computing apparatus, cause the apparatus to perform the operations or actions.

Computers suitable for the execution of a computer program can be based on general or special purpose processors, or any other kind of central processing unit. Generally, a central processing unit will receive instructions and data from a read-only memory, a random access memory, or quantum systems suitable for transmitting quantum data, e.g. photons, or combinations thereof.

The elements of a computer include a central processing unit for performing or executing instructions and one or more memory devices for storing instructions and digital, analog, and/or quantum data. The central processing unit and the memory can be supplemented by, or incorporated in, special purpose logic circuitry or quantum simulators. Generally, a computer will also include, or be operatively coupled to receive data from or transfer data to, or both, one or more mass storage devices for storing data, e.g., magnetic, magneto-optical disks, optical disks, or quantum systems suitable for storing quantum information. However, a computer need not have such devices.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

In certain cases, some or all of the quantum and/or classical circuit elements may be implemented using, e.g., superconducting quantum and/or classical circuit elements. Fabrication of the superconducting circuit elements can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit elements (e.g., qubits and qubit couplers) may be provided using classical circuit elements that are electrically and/or electromagnetically coupled to the quantum circuit elements. The control signals may be provided in digital and/or analog form.

Computer-readable media suitable for storing computer program instructions and data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or system that may include one or more processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A quantum computing device comprising:
a qubit, wherein the qubit comprises a superconducting qubit; and
a single XYZ control line, wherein the qubit and the single XYZ control line are configured and arranged such that, during operation of the quantum computing device, the single XYZ control line allows coupling of an XY qubit control flux bias, from the single XYZ control line to the qubit, over a first frequency range at a first predetermined effective coupling strength, and coupling of a Z qubit control flux bias, from the single XYZ control line to the qubit, over a second frequency range at a second predetermined effective coupling strength,
wherein the single XYZ control line comprises an inductor arranged to be inductively coupled to the qubit.

2. The quantum computing device of claim 1, wherein, during operation of the quantum computing device, the single XYZ control line allows coupling of the XY qubit control flux bias, from the single XYZ control line to the qubit, at a first predetermined mutual inductance between the inductor and the qubit, and coupling of the Z qubit control flux bias, from the single XYZ control line to the qubit, at a second predetermined mutual inductance between the inductor and the qubit.

3. The quantum computing device of claim 2, wherein the first predetermined mutual inductance is between the qubit and the inductor of the single XYZ control line, and the second predetermined mutual inductance is between a superconducting quantum interference device (SQUID) of the qubit and the inductor of the single XYZ control line.

4. The quantum computing device of claim 3, wherein the superconducting quantum interference device (SQUID) comprises a first Josephson junction and a second Josephson junction.

5. The quantum computing device of claim 4, wherein the second predetermined mutual inductance is determined at least by an asymmetry between the first Josephson junction and the second Josephson junction.

6. The quantum computing device of claim 5, wherein the asymmetry between the first Josephson junction and the second Josephson junction is at least 0.1.

7. The quantum computing device of claim 1, wherein the qubit comprises a transmon qubit.

8. The quantum computing device of claim 1, wherein the single XYZ control line has a geometry that results in the coupling of the XY qubit control flux bias, from the single XYZ control line to the qubit, over the first frequency range at the first predetermined effective coupling strength, and the coupling of the Z qubit control flux bias, from the single XYZ control line to the qubit, over the second frequency range at the second predetermined effective coupling strength.

9. The quantum computing device of claim 8, wherein the single XYZ control line comprises:
a superconductor trace forming a shape having an inner trace and an outer trace, in which the outer trace extends around, and is connected with, the inner trace.

10. The quantum computing device of claim 9,
wherein the outer trace comprises an outer ring formed at ends of elongated portions of the outer ring, and
wherein the inner trace comprises an inner ring formed at an end of, and having a first portion extending perpendicular to, an elongated portion of the inner trace.

11. The quantum computing device of claim 10,
wherein a length of the first portion is a first distance that at least partially determines the first predetermined effective coupling strength, and
wherein a length of the inner ring extending in a direction of the elongated portion of the inner trace is a second distance that at least partially determines the second predetermined effective coupling strength.

12. The quantum computing device of claim 1, wherein the single XYZ control line comprises a filter, wherein the filter comprises a first absorptive filter and a second reflective filter directly upstream of the first absorptive filter.

13. The quantum computing device of claim 12, wherein the first absorptive filter comprises magnetically loaded epoxide filter.

14. The quantum computing device of claim 12, wherein the single XYZ control line comprises:
a power combiner arranged to receive as inputs the Z qubit control flux bias and the XY qubit control flux bias at room temperature; and
a low pass filter arranged to filter an output of the first absorptive filter.

15. The quantum computing device of claim 14, wherein the inductor is electrically connected to an output of the low pass filter.

16. A method for implementing XYZ control, the method comprising:
- coupling an XY qubit control flux bias from a single XYZ control line to a qubit, wherein the coupling is performed over a first frequency range at a first predetermined effective coupling strength;
- coupling a Z qubit control flux bias from the single XYZ control line to the qubit, wherein the coupling is performed over a second frequency range at a second predetermined effective coupling strength; and
- inductively coupling an inductor to the qubit, wherein the qubit comprises a superconducting qubit.

17. The method of claim 16, comprising:
- coupling the XY qubit control flux bias from the single XYZ control line to the qubit at a first predetermined mutual inductance between the inductor and the qubit; and
- coupling the Z qubit control flux bias from the single XYZ control line to the qubit at a second predetermined mutual inductance between the inductor and the qubit.

18. The method of claim 17, wherein the first predetermined mutual inductance is between the qubit and the inductor of the single XYZ control line, and the second predetermined mutual inductance is between a superconducting quantum interference device (SQUID) of the qubit and the inductor of the single XYZ control line.

19. The method of claim 18, wherein the superconducting quantum interference device (SQUID) comprises a first Josephson junction and a second Josephson junction.

20. The method of claim 19, wherein the second predetermined mutual inductance is determined at least by an asymmetry between the first Josephson junction and the second Josephson junction.

21. The method of claim 20, wherein the asymmetry between the first Josephson junction and the second Josephson junction is at least 0.1.

* * * * *